Patented June 17, 1952

2,601,215

UNITED STATES PATENT OFFICE 2,601,215

PROCESS OF PREPARING DIHYDROPTERINS

Coy W. Waller and John H. Mowat, Pearl River, N. Y., assignors to American Cyanamid Company, New York, N. Y., a corporation of Maine No Drawing. Application March 17, 1948,
Serial No. 15,488

1 Claim. (Cl. 260—251.5)

This invention relates to organic compounds possessing biological activity and other useful properties and to processes of preparing the same.

In our U. S. Patent 2,500,296 issued March 14, 1950, of which this is a continuation-in-part, we disclosed that new organic compounds could be prepared by the reaction of 2,4,5-triamino-6-hydroxypyrimidine, and alpha,beta-dihalopropionaldehyde, and aminobenzoic acid or salts, esters, and amides thereof. The reaction was illustrated therein by the following equation:

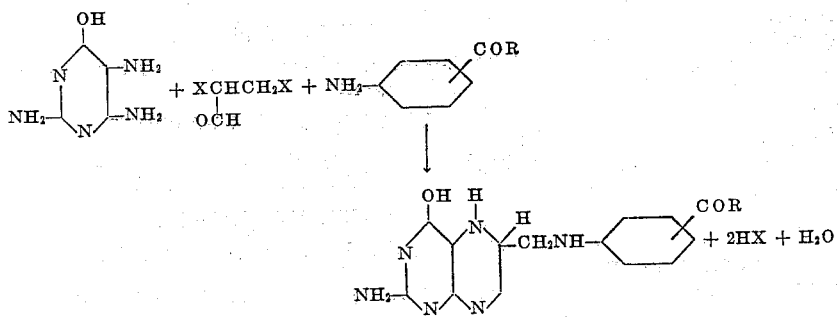

in which X is a halogen and R is —OH, —OR′, or —NR″R′″, R′ being an alkyl radical and R″ and R′″ being hydrogen or aliphatic or aromatic radicals.

As stated therein, two hydrogen atoms of the pyrazyl ring of the product were removed to yield compounds possessing useful biological activity, for example, pteroic acid, pteroylglutamic acid, and others. The present application describes in greater particularity dihydropteroic acid and its salts, esters and amides, which are obtained in that process as intermediates.

In our aforesaid earlier filed application the dihydropterins obtained as intermediates were oxidized under the conditions of the process and converted into pteroic acid, esters and amides thereof without isolation from the reaction mixture. Because of the many by-products associated with the reaction, it is not generally feasible to isolate the dihydropterins from the crude reaction mixture, the principal reason being that these dihydropterins are readily oxidized during the purification procedure, particularly in the presence of the various by-products of the reaction. We have found that for purposes of obtaining the product in a high state of purity it is better to first obtain pteroic acid or one of its salts, esters, and amides and thereafter reduce this purified material to the desired dihydro form.

To obtain the dihydropteroic acid and its salts, esters, and amides of the present invention in crude form we carry out the reaction described above under non-oxidizing conditions using 2,4,5-triamino-6-hydroxypyrimidine, or one of its tautomers, with one of the several alpha,beta-dihalopropionaldehydes, such as alpha,beta-dibromopropionaldehyde, alpha,beta-dichloropropionaldehyde, or one of these compounds in the form of its acetal. Also, as in our earlier application, we may use as the third reactant p-aminobenzoic acid or one of its various salts, esters, and amides, particularly those amides of amino acids, such as p-aminobenzoylglutamic acid, p-aminobenzoylaspartic acid, p-aminobenzoyldiglutamylglutamic acid, and the like.

To prepare the dihydropterins in purer form a suitable pterin, such as pteroylglutamic acid, pteroyldiglutamylglutamic acid, pteroylaspartic acid, pteroic acid, or the like, is first prepared and then reduced, for example, with platinum oxide and hydrogen, zinc dust in alkali, or other reducing agents which do not carry the reduction beyond the desired dihydro condition. The isolated crystalline product appears to be quite stable. To be more definite, the following examples of typical reductions and the characteristics of the resulting dihydropterin will be given.

Example 1

Platinum oxide (250 mgs.), 25 cc. of water and three drops of concentrated hydrochloric acid were placed in a reduction bottle and the catalyst activated with hydrogen. To this mixture was added a solution of 3.0 grams of pteroylglutamic acid in 70 cc. of .6 N sodium hydroxide. The material was then reduced at room temperature and atmospheric pressure. It required about five hours to reduce, during which time approximately 165 cc. of hydrogen were absorbed. The calculated amount necessary to reduce the compound to the dihydro form is 153 cc. The mixture was then treated with a small amount of charcoal, filtered, and the filtrate immediately cooled to 10° C. It was acidified to pH 2.7, cooled for thirty minutes, centrifuged, washed with water, methanol and ether, and dried; yield 2.65 grams.

This material was purified as follows: 1.75 grams of the product were dissolved in 20 cc.

of ice-cold concentrated hydrochloric acid, treated with about .5 gram of charcoal, and filtered. The charcoal was washed with 3 cc. of concentrated hydrochloric acid, and the filtrate and washing combined and cooled in an ice-bath. Water was added slowly with stirring and seeding until the product began to appear. Enough water was added to make the solution 3–4 N hydrochloric acid. The crystalline product was filtered off, washed with 3 N HCl, acetone and ether, and dried; yield 1.1 grams. This was crystallized two more times using the same procedure; yield 0.5 gram; small needle-like crystals, gray in color. This was the hydrochloride of dihydropteroylglutamic acid.

Analyses:

| Found | Calcd. for $C_{19}H_{22}N_7O_6Cl$ |
|---|---|
|  | Per Cent |
| C 47.96% | 47.6 |
| H 5.25% | 4.6 |
| N 20.75% | 20.45 |
| Cl 7.50% | 7.4 |

The amount of hydrogen absorbed in the preparation of the compound was approximately equivalent to the amount calculated to be necessary to form a dihydro-derivative.

When the crystalline material described above was oxidized with alkaline potassium permanganate using just the amount calculated to be necessary to oxidize the dihydropteroylglutamic acid to pteroylglutamic acid a good yield of almost pure pteroylglutamic acid was obtained.

*Example 2*

Dihydropteroylglutamic acid has also been prepared by the following procedure: 2 grams of pteroylglutamic acid were dissolved in 150 cc. of a 1.5 N sodium hydroxide solution. 4.0 grams of zinc dust (containing 3% copper) were added, and the mixture stirred for thirty minutes. The zinc was filtered off, the solution cooled to 10° C., and neutralized to pH 3.0. After cooling well the solid was collected, washed, and dried; yield 1.8 grams.

This was purified by the procedure described above, and the same compound was obtained. The ultraviolet adsorption spectra of this compound differs markedly from that of pteroylglutamic acid. In .1 N NaOH pteroylglutamic acid has three maxima at 255 m$\mu$, 282½ m$\mu$ and 365 m$\mu$, whereas the dihydropteroylglutamic acid in .1 N NaOH has only one maximum at 285 m$\mu$.

Other polyglutamic acid amides of dihydropteroic acid have likewise been prepared by reduction of suitable pteroylglutamates.

We claim:

A process which comprises mixing together and heating under non-oxidizing conditions, 2,4,5-triamino-6-hydroxypyrimidine, alpha,beta-dibromopropionaldehyde, and para-aminobenzoylglutamic acid.

COY W. WALLER.
JOHN H. MOWAT.

REFERENCES CITED

The following references are of record in the file of this patent:

UNITED STATES PATENTS

| Number | Name | Date |
|---|---|---|
| 2,545,305 | O'Dell | Mar. 13, 1951 |

OTHER REFERENCES

O'Dell et al.: J. Am. Chem. Soc. 69, 250–253 (1947).

Angier et al.: Science 103, 667–669 (1946).